United States Patent [19]

Messenger

[11] Patent Number: 4,609,025
[45] Date of Patent: Sep. 2, 1986

[54] TIRE AND RIM SAFETY RESTRAINT DEVICE

[75] Inventor: Ronald E. Messenger, Mogadore, Ohio

[73] Assignee: GenCorp Inc., Akron, Ohio

[21] Appl. No.: 780,872

[22] Filed: Sep. 27, 1985

[51] Int. Cl.$^4$ .............................................. B60C 25/00
[52] U.S. Cl. ......................................... 157/1; 414/462
[58] Field of Search ................... 157/1; 414/462, 463, 414/466

[56] References Cited

U.S. PATENT DOCUMENTS

| | | | |
|---|---|---|---|
| 3,435,971 | 4/1969 | Powell | 414/463 |
| 3,687,442 | 8/1972 | Goff | 157/1 |
| 4,312,620 | 1/1982 | Muschalek, Jr. | 414/466 |
| 4,479,522 | 10/1984 | Lapham | 157/1 |

Primary Examiner—James G. Smith

[57] ABSTRACT

A safety device for restraining a multiple part rim during the inflation of a truck tire is designed to be used on a hydraulically adjustable platform of a service vehicle. The device includes a top restraint frame that is designed to be mounted on horizontal frame members of the vehicle and is slidable between a storage position under the vehicle body and a position above the adjustable platform. Before the tire is inflated, the assembled tire and rim are placed on the platform and the top restraint frame is pulled over them. A chain is fastened to both the platform and the restraint frame and is passed through the central opening in the rim to restrain the tire and rim parts from too much lateral movement.

9 Claims, 4 Drawing Figures

TIRE AND RIM SAFETY RESTRAINT DEVICE

FIELD OF THE INVENTION

This invention relates to a safety device for restraining a multiple part rim during the inflation of a truck tire, and particularly to such a device that can be mounted on a service vehicle for use in the field.

BACKGROUND OF THE INVENTION

Truck tires are commonly mounted on rims having two or more parts. During the mounting and inflation of truck tires on multiple part rims, it is possible that the lock ring and/or other parts of the rim, may become separated from the tire-rim assembly, causing the bead of the tire to become unseated from the rim and thus a sudden release of pressurized air from within the tire. This released air pressure can be extremely high and can cause the separated rim parts to be projected away from the assembly with considerable speed and force. When this happens, the rim is said to "explode". In order to protect persons and property in the event of such a rim explosion, safety devices or cages are used to restrain the multiple part rim during the inflation of truck tires. These cages must be capable of withstanding the large forces produced by the impact of flying rim parts. As a result, most of the cages are heavy and not readily moved.

In many instances, however, it is desired to mount and inflate a truck tire in the field. For example, when a tire is repaired and must be reinflated, such reinflations may occur on the highway or elsewhere away from the location of a conventional tire cage. It is often difficult or impossible to move the heavy tire cages to a field location. As a result, it is usually necessary to take the rim and tire to an installation where the cage is available to inflate the tire.

Several safety cages have been designed for use in the field which are collapsible and of relatively light weight so they can be stored conveniently on a service vehicle. U.S. Pat. No. 4,479,522, assigned to The General Tire & Rubber Company, discloses a design of and a portable safety cage. The cage has a base of two elongated tubular members, designed to rest horizontally on the ground, a vertical shaft connected to the midportion of the base, and a removable top retainer also made of tubular members. The top retainer slides onto the vertical shaft with opposite end portions extending over the top of a tire and rim combination sitting on the base. These basic design elements also exist in a prior portable safety cage sold by Myers Tire Supply Company of Akron, Ohio, but the design of the cage shown in the '522 patent includes a structural modification to the top retainer member, an inner support member designed to fit within the tire rim, and a means for maintaining the top retainer at a position rotated 90° from the bottom retainer. In testing the cage, these modifications proved successful in preventing severe distortions to the base and retainer portions of the cage and thus eliminated the major cause of the lock-ring of the multiple piece rim escaping. However, because of the narrow, elongated shape of the top retainer member, the lock-ring was still prone to extreme bending about this retainer member and in some tests was able to free itself from the cage, although at a lower velocity than with cages of previous designs.

A possible solution to containing the lock ring better might be to make the top retainer member wider or to make it fan out in other directions over the top of the tire. However, this would add to the weight of the cage and reduce its collapsibility. Thus, it would be more difficult to transport and store the device.

The safety cage sold by Myers Tire Supply Company and another safety cage manufactured by Ken-Tool Division of Warren Tool Corporation, and the problems experienced with these cages are discussed in detail in the above mentioned U.S. Pat. No. 4,479,522.

SUMMARY OF THE INVENTION

The present invention provides a different approach to making a tire and rim restraint device transportable. Unlike the portable devices mentioned above, the device of the present invention is designed to be used on a field service vehicle, and specifically on the hydraulically adjustable platform that is mounted at the rear of most vehicles that are used in the field repair of heavy truck tires. When not in use, the major parts of the restraint device are conveniently stored in an out-of-the-way place underneath the bed of the service vehicle.

One advantage of the invention is that by employing a hydraulically adjustable platform as the base on which the tire and rim sit, the hydraulic cylinder supporting the platform resiliently absorbs part of the force of any explosion that might occur during inflation of the tire. Thus, the top restraining parts of the device of the invention do not receive as much force and do not have to be made as strong or as heavy as they otherwise would be. This reduces the cost of manufacture of the device and makes it more easily storable when not in use.

Another advantage of the invention is that because the restraint device is designed to be both stored and used on a service vehicle, the top restraint member can be made wider and extend over more area of the tire and rim combination, without making the device cumbersome when not in use.

The restraint device of the present invention includes a top restraint frame that is designed to be mounted on horizontal frame members of the vehicle and is slidable between a storage position under the vehicle body and an operating position in which the top restraint member extends partly over the vertically adjustable platform. The top restraint frame has two horizontally spaced apart elongated side structural members positioned to be supported on the horizontal vehicle frame members, spaced apart inner and outer crosswise structural members connected between the side structural members, and a central structural member connected between the crosswise structural members. The crosswise and central structural members are located above the vertically adjustable platform when the top restraint frame is in its operating position. The restraint device also includes an elongated flexible rim retainer, preferably a link-type chain, having means for being secured at a location on the vertically adjustable platform which is directly beneath the junction of the central structural member with the inner crosswise structural member when the top restraint frame is in its operating position. At its other end, the flexible rim restrainer has a hooking means for securing the end of the restrainer to another link or portion of the restrainer after the restrainer has been wrapped around the structural members of the restraint frame. The restraint device further includes housing members mountable on horizontal frame members of the vehicle, which restrain the upward movement of the side structural members of the top restraint frame.

The present invention also provides a method of securing a tire and rim to a restraint device that includes the steps of (a) placing the tire and rim on the adjustable platform with the central opening of the rim above the location where the flexible rim restrainer is connected to the platform; (b) pulling a top restraint frame over the top of the tire and rim; (c) hydraulically raising the adjustable platform to a level at which the tire is spaced a slight distance below the restraint frame; and (d) pulling the flexible rim restrainer up through the central opening of the rim, wrapping the flexible restrainer around a member of the top restraint frame above the central rim opening, and securing flexible restrainer so that there is only a slight amount of slack between the connection of the restrainer with the platform and the connection of the restrainer with the top restraint frame.

PREFERRED EMBODIMENT OF THE INVENTION

Figure 1:
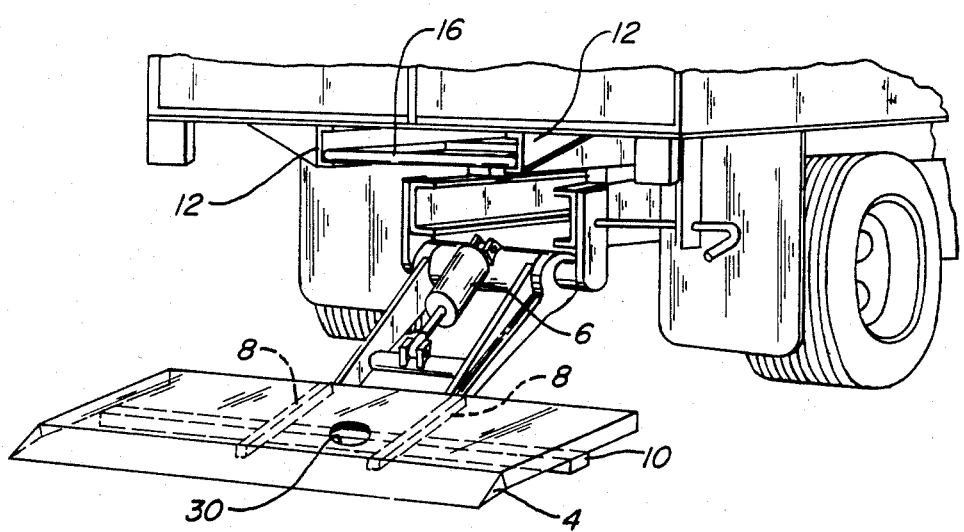
FIG. 1 is a perspective view of a service vehicle equipped with a restraint device, illustrating one embodiment of the present invention.

Referring to FIG. 1, a tire service vehicle 2 has a vertically adjustable platform 4 that is raised and lowered by hydraulic cylinder 6. The platform 4 has a frame structure that normally includes two 2 inch by 2 inch frame rails 8 in its center portion. In addition a reinforcing bar 10 of 2 inch by 2 inch steel is welded across the frame rails 8 and preferably extends all the way across the platform. Preferably the service vehicle 2 has either a 1,600 pound load capacity, such as is used on a one ton truck, or a 1,000 pound load capacity, such as is used on a ¾ ton truck.

The service vehicle 2 also has two horizontal frame members 12. These frame members support a top restraint frame 16 that is slidable on the frame members 12 between a storage position shown in FIG. 1 and an operating position shown in FIGS. 2 and 3. As shown in the top view of FIG. 3, the restraint frame 16 has two parallel horizontally spaced elongated side structural members 18 which slide on the respective bottom flanges of the vehicle frame members 12. Also, the restraint frame 16 has an outer crosswise structural member 22 and an inner crosswise structural member 24 which hold the side structural members in their parallel spaced apart relationship. Finally, there is a central structural member 26 connected between the crosswise structural members 22 and 24. All of the structural members 18, 22, 24 and 26 are preferably made of heavy steel tubing. A recommended tubing size is 2 inches outside diameter, with a ¼ inch wall thickness.

A link-type chain 28 extends at one end through a hole 30 in the central part of the platform 4 and is wrapped around the reinforcing bar 10 on the underneath side of the platform 4. The chain 28 is designed to extend through the central opening in a rim R of the tire and rim unit that is to be restrained. A hook 32 on the other end of the chain 28 is designed to be secured to an intermediate link on the chain after the chain has been wrapped around the junction 34 between the inner crosswise structural member 24 and the central structural member 26 of the restraint frame 16. When so secured, the chain 28 forms a flexible rim restrainer connected between the reinforcing bar 10 of the platform 4 and the junction 34 between the structural members of the top frame 16, with the links of the chain 28 extending through the central opening of a rim R to be restrained. Preferably the chain is a "System 4" type chain having links made of ⅜ inch bar stock and 2⅛ inches in length. The entire length of the chain should be between 5½ and 6 feet. The hook 32 is a heavy duty hook preferably with a 5,400 pound working load limit.

Figure 4:
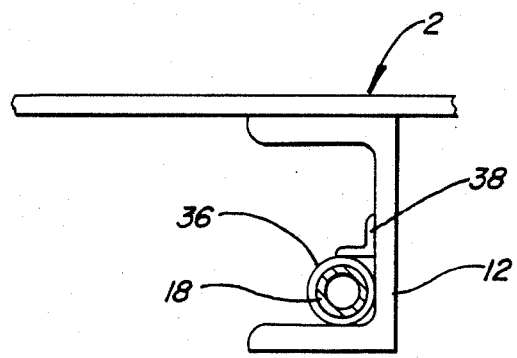
FIG. 4 is a partial sectional view of the restraint device of FIGS. 1, 2 and 3, taken along lines III—III of FIG. 2.

The side structural members 18 of top restraint frame 16 that slide on the horizontal frame members 12 of the vehicle 2 must be held from upward movement in the case of an explosion of a tire and rim. For this purpose, two approximately one-foot long housing members in the form of tubes 36 are mounted on the vehicle frame members 12. The tubes 36, best seen in the sectional view of FIG. 4, have a recommended 2⅞ inch outside diameter and a ¼ inch wall thickness. The tubes 36 are designed to be welded to the vehicle frame members 12 and further held in place by welding them to ½ inch by ½ inch steel L beams, each having a ¼ inch flange thickness. If a tire and rim combination explodes beneath the outward, extended end of the restraint frame 16, the extended end of the frame will bend upwardly, but the portions of the structural members 18 of the frame within the tubes 36 will be held in the horizontal position. Thus, the bending of the structural members 18 will absorb part of the energy released by the tire and rim explosion.

Figure 2:
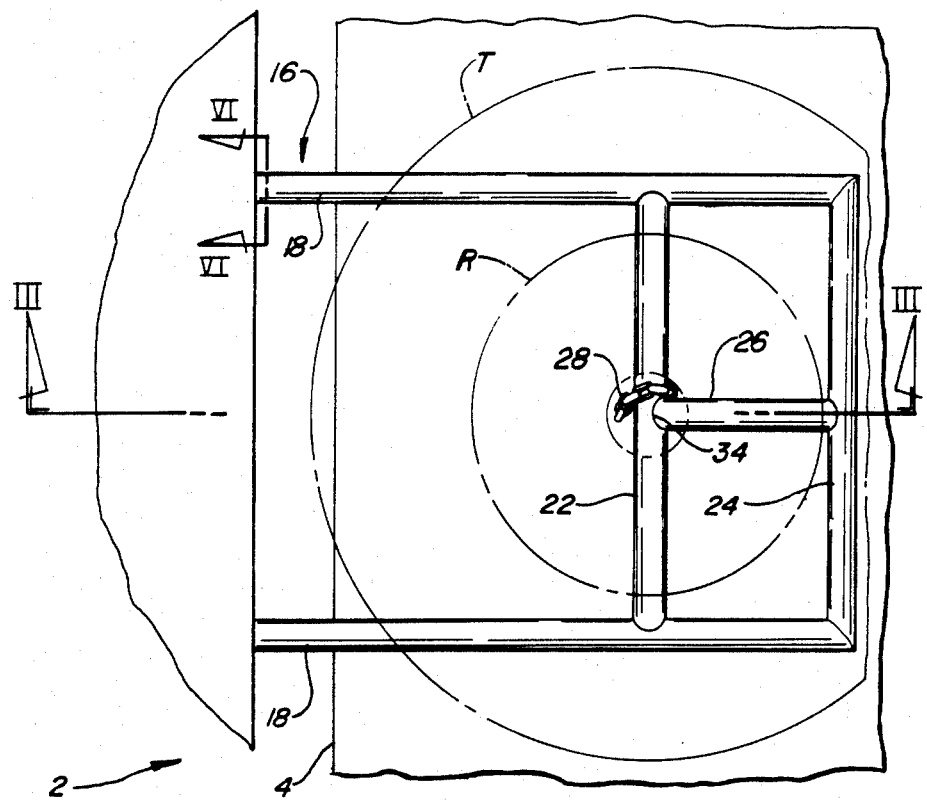
FIG. 2 is a partial side view of the vehicle and restraint device of FIG. 1.
Figure 3:
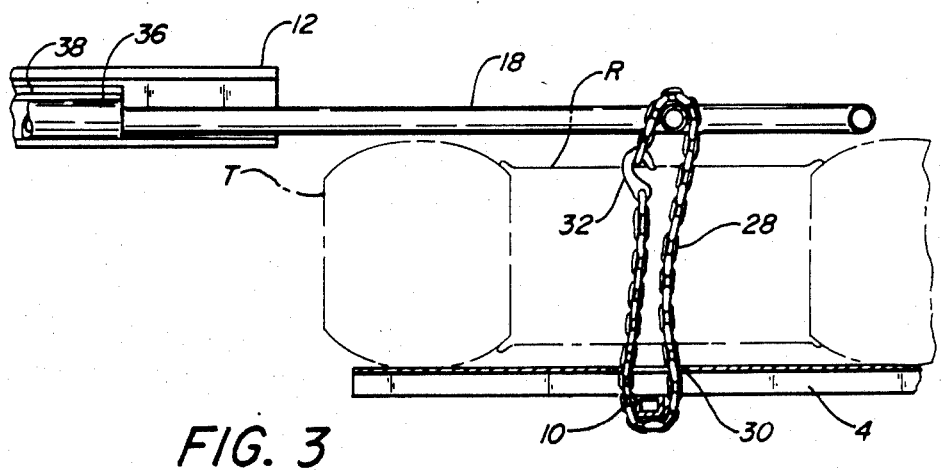
FIG. 3 is a partial top view of the vehicle and restraint device of FIGS. 1 and 2.

In operation, a rim R with a tire T to be inflated, shown in chain lines in FIGS. 2 and 3, is placed on the hydraulically adjustable platform 4, preferably when the platform is in its lower most position and the top restraint frame 16 is in its retraced position shown in FIG. 1. Then, the restraint frame 16 is pulled over the top of the tire and rim, and the platform 4 is raised by the hydraulic cylinder 6 to the level shown in FIGS. 2 and 3. The platform 4 should be raised to a position in which the top surface of the tire is spaced slightly below the top restraint frame 16, allowing just enough room for the tire to be inflated without coming into contact or interference with the frame 16. With the tire and rim set in this position, the chain 28 is wrapped around the reinforcing bar 10 of the platform 4, and around the junction 34 between the crosswise structural member 24 and the central structural member 26 of the restraint frame 16. The hook 32 on one end of the chain is then fastened to a link near the other end, preferably so there is a slight amount of slack in the chain between its connection with the platform 4 and its connection with the top restraint frame. The various parts of the restraint device are then in position to restrain the tire and rim in case of an explosion while the tire is being inflated.

In three tests that were conducted using a one ton truck with a 1,600 pound capacity hydraulic lift platform and one test using a three-quarter ton truck with a 1,000 pound capacity hydraulic lift platform, a restraint device having parts of the above stated dimensions was used to restrain tire and rim combinations with size 12.00-24 tires, which is one of the largest truck or bus tires currently on the market. The rims were multiple piece rims, with the lock rings modified so that their ends could be forced apart with a ten-ton Porta-Power hydraulic jack. The tires having a maximum inflation pressure of 120 psi were inflated to 180 psi, and then the hydraulic jack was activated to force apart the lock ring ends to cause the explosion. In all tests, all tire and rim components, including the lock ring, remained held by the chain and within the confines of the restraint device. The platform was forced downward against the pressure and the cylinder in its hydraulic cylinder, and the cylinder thus acted as a spring to absorb a large amount of the energy released by the explosion. There was minimal damage to the platform, and in each case the damage consisted of some platform sections being bent but capable of being straightened out and returned to service. In all tests, the chain remained hooked together and unbroken, but in one case the welds were broken between the reinforcing bar 10 and the framework of the platform. Beside the platform, no other parts of the vehicle were damaged. The top restraint frames were distorted and required replacement, but these relatively inexpensive parts were the only items needing replacement.

Thus, the invention provides a restraint device for use in the field repair of tires on multiple piece rims, which provides improved restraining capabilities over prior tire/rim restraint devices designed for field use, yet can be easily stored in an out-of-the-way place for transport on a service vehicle. Also, the parts of the restraint device that are usually damaged beyond repair by a tire/rim explosion are relatively inexpensive and simple to construct.

While one embodiment of the present invention has been shown and described, other embodiments, modifications and additions will of course be apparent to those skilled in the art, while remaining within the scope of the following claims.

I claim:

1. A restraint device for use in inflating tires on multiple-piece rims, said restraint device designed to be mounted on a service vehicle having two horizontal frame members and a hydraulically vertically adjustable platform mounted on the vehicle, said restraint device comprising:
    (a) a top restraint frame mountable on the horizontal vehicle frame members and slidable between a storage position under the vehicle body and an operating position in which the top restraint member extends partly over the vertically adjustable platform, the top restraint frame having two horizontally spaced elongated side structural members positioned to be supported on the horizontal vehicle frame members, spaced apart inner and outer crosswise structural members connected between the side structural members, and a central structural member connected between the crosswise structural members, the crosswise and central structural members being located above the vertically adjustable platform when the top restraint frame is in its operating position;
    (b) an elongated flexible rim restrainer having means for being secured at a location on the vertically adjustable platform which is directly beneath the junction of the central structural member with the inner crosswise structural member when the top restraint frame is in its operating position, said flexible rim restrainer also having a hook means at one end for securing the end of the restrainer to another portion of the restrainer to fix the restrainer in a position extending between the platform and the top restraint frame at the said junction; and
    (c) two housing members mountable on the vehicle frame, said housing members slidably housing the side structural members of the top restraint frame and restraining the upward movement of the side structural members.

2. The restraint device of claim 1 wherein the structural members, crosswise structural members and central structural member of the top restraint member are made of tubular steel.

3. The restraint device of claim 2 wherein the tubular steel structural members have a wall thickness of at least a quarter of an inch and an outside diameter of approximately two inches.

4. The restraint device of claim 1 wherein the means for securing the flexible rim restrainer to the vertically adjustable platform includes a reinforcing bar connectable to the structural framework of the platform, so as to extend through a location directly beneath the junction of the central structural member with the inner crosswise member when the top restraint frame is in its operating position, said flexible restrainer being looped around or otherwise attached to said reinforcing bar at said location.

5. A service vehicle equipped with a restraint device for use in inflating tires on multiple piece rims, the vehicle having a frame with two horizontal frame members and hydraulically vertically adjustable platform mounted on the frame, said restraint device comprising:
    (a) a top restraint member slidably mounted on the horizontal frame members between a storage position under the vehicle body and an operating position in which the restraint member extends partly over the vertically adjustable platform, and having two horizontally spaced elongated side structural members on the horizontal vehicle frame members, spaced apart inner and outer crosswise structural members connected between the side structural members, and a central structural member connected between the crosswise structural members, the crosswise and central structural members being located above the vertically adjustable platform of the vehicle;
    (b) an elongated flexible rim restrainer having means for being secured to the vertically adjustable platform of the vehicle at a location on the platform directly beneath the junction of the central structural member and the inner crosswise structural member when the restraint frame is in its operating position, said flexible restrainer having at one end a hook means for securing the end of the restrainer to another portion of the restrainer to fix the restrainer in a position extending between the platform and the top restraint frame at the said junction; and
    (c) two housing members mountable on the vehicle frame, said housing members slidably housing the side structural members of the top restraint frame and restraining the upward movement of the side structural members.

6. The service vehicle equipped with a restraint device of claim 5 wherein the structural members, crosswise structural members and central structural member of said top restraint member are made of tubular steel.

7. The service vehicle equipped with a restraint device of claim 6 wherein the tubular steel structural members have a wall thickness of at least a quarter of an inch and an outside diameter of approximately two inches.

8. The service vehicle equipped with a restraint device of claim 5 wherein the vertically adjustable platform has a framework that includes a reinforcing bar having a portion extending directly beneath the junction of the central structural member with the inner crosswise member when the top restraint frame is in its operating position, the flexible rim restrainer being looped around or otherwise attached to said reinforcing bar at said location.

9. A method of securing a tire mounted on a rim to a restraint device mounted on a service vehicle having a hydraulically vertically adjustable platform, the restraint device including a top restraint frame slidably mounted on the vehicle frame and a flexible rim restrainer that is connected at one end to the vertically adjustable platform at a central location on the platform, said method comprising the steps of:

(a) placing the tire and rim on the adjustable platform with the central opening of the rim above the location where the flexible rim restrainer is connected to the platform, (b) pulling a top restraint frame over the top of the tire and rim, (c) hydraulically raising the adjustable platform to a level at which the tire spaced a slight distance below the restraint frame, and (d) pulling the flexible rim restrainer up through the central opening of the rim, wrapping the flexible restrainer around a member of the top restraint frame above the central rim opening, and securing flexible restrainer so there is a slight amount of slack between the connection of the restrainer with the platform and the connection of the restrainer with the top restraint frame.

* * * * *